US009933595B1

(12) United States Patent
Mischel, Jr. et al.

(10) Patent No.: US 9,933,595 B1
(45) Date of Patent: Apr. 3, 2018

(54) MOUNTING STRUCTURE FOR A MIRROR ASSEMBLY

(71) Applicant: ELECTRIC MIRROR, LLC, Everett, WA (US)

(72) Inventors: James V. Mischel, Jr., Seattle, WA (US); Patrick Daniel Erickson, Seattle, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 0 days.

(21) Appl. No.: 15/700,191

(22) Filed: Sep. 11, 2017

Related U.S. Application Data

(63) Continuation of application No. 14/822,860, filed on Aug. 10, 2015, which is a continuation of application No. 12/928,524, filed on Dec. 13, 2010, now Pat. No. 9,105,202, which is a continuation of application No. 12/425,186, filed on Apr. 16, 2009, now Pat. No. 7,853,414, which is a continuation-in-part of application No. 12/047,243, filed on Mar. 12, 2008, now Pat. No. 7,805,260, which is a
(Continued)

(51) Int. Cl.
*G02B 7/182* (2006.01)
*G09F 19/14* (2006.01)
*G09F 9/00* (2006.01)

(52) U.S. Cl.
CPC ............. *G02B 7/182* (2013.01); *G09F 9/00* (2013.01); *G09F 19/14* (2013.01)

(58) Field of Classification Search
CPC .................................................... G02B 7/182
See application file for complete search history.

(56) References Cited

U.S. PATENT DOCUMENTS

| 1,908,147 A | 11/1931 | Heogger |
| 2,286,247 A | 6/1942 | Yearta |
| 2,815,433 A | 12/1957 | Zumwalt |

(Continued)

FOREIGN PATENT DOCUMENTS

| GB | 2419091 | 4/2006 |
| JP | 09127882 | 5/1997 |
| JP | 2007014756 | 1/2007 |

OTHER PUBLICATIONS

Seura, Inc., Television Mirror Instalation Guide, Jul. 1, 2004, Seura Inc., Green Bay, Wisconsin.
(Continued)

*Primary Examiner* — John Breene
*Assistant Examiner* — Yaritza H Perez Bermudez
(74) *Attorney, Agent, or Firm* — Peloquin, PLLC; Mark S. Peloquin, Esq.

(57) ABSTRACT

A mirror assembly mountable to a wall includes a mirror platform having a front surface and a rear surface, a chassis engageable with the mirror platform to define a mirror assembly interior, at least one electrical component disposed within the mirror assembly interior, and a mounting structure. The mounting structure includes a support member mounted to one of the rear surface of the mirror platform and the chassis and a hanger member mounted to the other of the rear surface of the mirror platform and the chassis. The hanger member is removeably securable on the support member to mount the mirror platform to the chassis.

30 Claims, 14 Drawing Sheets

Related U.S. Application Data continuation-in-part of application No. 11/563,119, filed on Nov. 24, 2006, now Pat. No. 8,099,247.

(60) Provisional application No. 60/794,209, filed on Apr. 21, 2006, provisional application No. 60/739,399, filed on Nov. 23, 2005, provisional application No. 60/739,156, filed on Nov. 23, 2005, provisional application No. 61/045,529, filed on Apr. 16, 2008.

(56) References Cited

U.S. PATENT DOCUMENTS

| | | | |
|---|---|---|---|
| 2,928,199 | A | 3/1960 | Novak |
| 3,038,771 | A | 6/1962 | Schwartz et al. |
| 3,298,655 | A | 1/1967 | Palm |
| 3,597,586 | A | 8/1971 | Rebovich |
| 3,618,804 | A | 11/1971 | Krause |
| 3,668,798 | A | 6/1972 | Mehl |
| 3,709,456 | A | 1/1973 | Pietsch |
| 3,863,883 | A * | 2/1975 | Cousins .............. A47G 1/24 248/477 |
| 4,251,316 | A | 2/1981 | Smallbone |
| 4,733,229 | A | 3/1988 | Whitehead |
| 5,140,506 | A | 8/1992 | Katz |
| 5,592,240 | A | 1/1997 | Sakamoto et al. |
| 5,726,728 | A | 3/1998 | Kondo |
| 6,567,060 | B1 | 5/2003 | Sekiguchi |
| 6,709,114 | B1 | 3/2004 | Duggan et al. |
| 6,833,880 | B1 | 12/2004 | Chen |
| 6,854,854 | B2 | 2/2005 | Hoelen et al. |
| 6,906,766 | B2 | 6/2005 | Lim |
| 6,921,174 | B1 | 7/2005 | Duggan et al. |
| 7,012,727 | B2 | 3/2006 | Hutzel et al. |
| 7,287,737 | B2 * | 10/2007 | Rossi .............. A47G 1/02 248/475.1 |
| 7,453,686 | B2 | 11/2008 | Elberbaum |
| 7,499,117 | B2 | 3/2009 | Maekawa |
| 7,551,354 | B2 | 6/2009 | Horsten et al. |
| 7,559,668 | B1 | 7/2009 | Aubrey |
| 7,770,985 | B2 * | 8/2010 | Davis .............. E06B 3/7001 312/204 |
| 7,965,357 | B2 | 6/2011 | Van De Witte et al. |
| 2002/0015226 | A1 | 2/2002 | Rottcher |
| 2003/0002296 | A1 | 1/2003 | Steiner |
| 2005/0168813 | A1 | 8/2005 | Benning et al. |
| 2006/0150462 | A1 | 7/2006 | Rossi |
| 2007/0046481 | A1 | 3/2007 | Vokey et al. |
| 2007/0091223 | A1 | 4/2007 | Maruta et al. |
| 2007/0159316 | A1 | 7/2007 | Mischel et al. |
| 2007/0201132 | A1 | 8/2007 | Cannon et al. |
| 2008/0030883 | A1 | 2/2008 | Oehmann |

OTHER PUBLICATIONS

Electric Mirror, LLC, Integrity Drawings, Jul. 2, 2004, Electric Mirror, LLC, Everett, WA.

Electric Mirror, LLC, Integrity Drawings, Jul. 15, 2004, Electric Mirror, LLC, Everett, WA.

* cited by examiner

MOUNTING STRUCTURE FOR A MIRROR ASSEMBLY

CROSS-REFERENCE To RELATED APPLICATIONS

This application is a continuation of U.S. patent application Ser. No. 14/822,860, filed on Aug. 10, 2015 which is a continuation of U.S. patent application Ser. No. 12/928,524, filed on Dec. 13, 2010, now U.S. Pat. No. 9,105,202, which is a continuation of U.S. patent application Ser. No. 12/425,186, filed on Apr. 16, 2009, now U.S. Pat. No. 7,853,414, which is a continuation-in-part of U.S. patent application Ser. No. 12/047,243, filed Mar. 12, 2008, now U.S. Pat. No. 7,805,260, which is a continuation-in-part of prior U.S. patent application Ser. No. 11/563,119, filed Nov. 24, 2006, now U.S. Patent No. 8,099,247, which claims the benefit of U.S. Provisional Application No. 60/794,209, filed Apr. 21, 2006; U.S. Provisional Application No. 60/739,399, filed Nov. 23, 2005; and U.S. Provisional Application No. 60/739,156, filed Nov. 23, 2005, the disclosures of which are all expressly incorporated herein by reference. U.S. patent application Ser. No. 12/425,186, filed on Apr. 16, 2009 also claims the benefit of U.S. Provisional Application No. 61/045,529, filed on Apr. 16, 2008. This application is related to U.S. patent application Ser. No. 15/700,187 titled "MOUNTING STRUCTURE FOR A MIRROR ASSEMBLY," filed on the same day and is hereby incorporated by reference.

BACKGROUND OF THE INVENTION

Certain mirror assemblies include integrated electrical components, such as televisions, light sources, defogger assemblies, etc. The mirror assembly normally includes a minor reversibly affixed to a chassis, wherein the chassis is suitably designed to be mounted to a wall. The electrical components are either secured within the chassis or mounted to the back of the mirror. This arrangement is a convenient space saving device as it embeds the electrical components into the existing space occupied by a mirror.

The mirror is typically secured to the chassis through a plurality of mounting brackets disposed on the outer edge of the chassis. The mounting brackets are adapted to engage a portion of the mirror, such as the mirror frame. The mounting brackets are permanently or semi-permanently secured to the mirror frame with fasteners, adhesive, etc.

Mounting the mirror to the chassis in this manner has several drawbacks. For instance, it is often difficult to properly align the mirror on the chassis when securing the mounting brackets thereto. This can lead to increased installation time and costs. The exposed mounting brackets are also unsightly to someone looking at the minor assembly from the side.

Moreover, permanently or semi-permanently securing the mounting brackets between the chassis and mirror causes problems when mounting the mirror assembly to the wall and when disassembling the minor. To mount the mirror assembly to the wall, the chassis must first be secured to the mirror, and the mirror assembly is thereafter secured to the wall W. Securing the entire mirror assembly to the wall is cumbersome and difficult. Moreover, to disassemble the mirror assembly, the entire minor assembly must be removed from the wall.

Thus, it is desired to have a mirror mounting assembly that allows the mirror to be secured to the chassis in an easy, aesthetically pleasing, reliable manner.

SUMMARY

A mirror assembly mountable to a wall includes a mirror platform having a front surface and a rear surface, a chassis engageable with the mirror platform to define a mirror assembly interior, at least one electrical component disposed within the mirror assembly interior, and a mounting structure. The mounting structure includes a support member mounted to one of the rear surface of the mirror platform and the chassis and a hanger member mounted to the other of the rear surface of the mirror platform and the chassis. The hanger member is removably securable on the support member to mount the mirror platform to the chassis.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
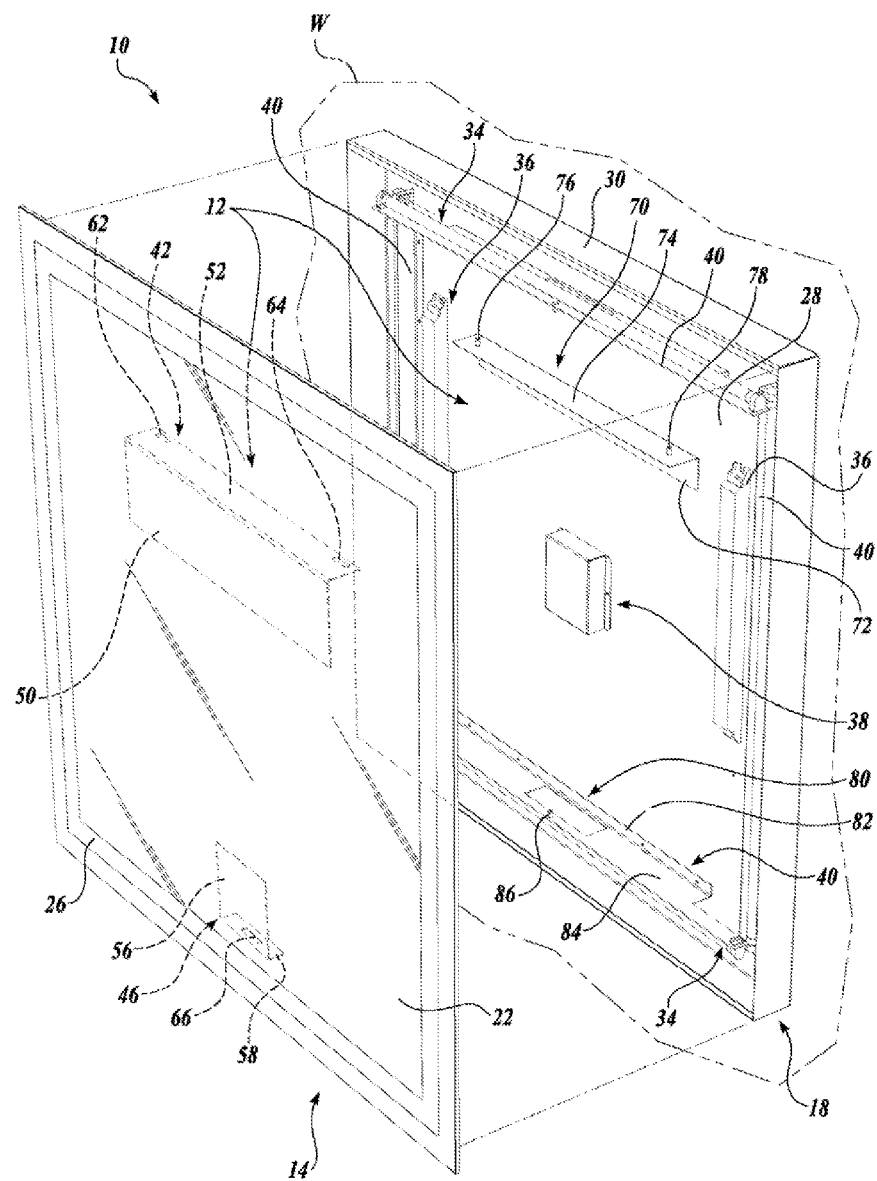
FIG. 1 is a mirror assembly having a internal mounting structure constructed in accordance with one embodiment of the present disclosure.

A mirror assembly 10 having an internal mounting structure 12 constructed in accordance with one embodiment of the present disclosure may be best understood by referring to FIG. 1. Although the internal mounting structure 12 may be used with any suitable mirror assembly, an exemplary embodiment of the mirror assembly 10 includes a chassis 18 and a framed or frameless mirror platform 14, wherein the internal mounting structure 12 secures the mirror platform 14 to the chassis 18.

The mirror platform 14 includes a first substantially reflective surface 22, a second non-reflective, rear surface 24 (see FIGS. 2 and 3), and one or more translucent back lit portions 26. The one or more translucent back lit portions 26 have minimal reflectivity, and are formed from any suitable material, such as frosted glass, acid etched glass, or clear glass. The translucent back lit portions 26 allow light emitted from one or more light sources 34 disposed within the chassis 18 to pass through the mirror platform 14. The number, configuration, and arrangements of translucent back lit portions 26 can be varied to achieve different lighting effects. As a non-limiting example, the translucent back lit portions 26 are configured as a single, continuous portion extending around the perimeter of the mirror platform 14.

The chassis 18 is adapted to engage the mirror platform 14 and mount the mirror platform 14 to a wall W. The chassis 18 also houses any mirror electrical components, such as the light sources 34, electrical ballasts 36, and a power cover 38 for a terminal box (not shown). Although the chassis 18 may be any suitable design that can properly support the mirror electrical components and mount the mirror platform 14 to a wall W, an exemplary embodiment of the chassis 18 includes a major surface 28 that is substantially sized and shaped to correspond to the mirror platform 14, which may be rectangular, round, oval, or any other suitable shape. The major surface 28 is positionable in a parallel relationship to the mirror platform 14 when the chassis 18 is engaged with the mirror platform 14.

The electrical components, such as the light sources 34, electrical ballasts 36, and power cover 38 are preferably secured to the chassis major surface 28 in any suitable manner. For instance, the light sources 34 may be secured around the perimeter of the major surface 28 through a plurality of L-shaped lamp brackets 40. The lamp brackets 40 are secured to the chassis major surface 28 with any suitable fastener, such as screws or an adhesive. The electrical ballasts 36 and power cover 38 are secured directly to the chassis major surface 28 with suitable fasteners such as screws, adhesive, etc.

Figure 10A:
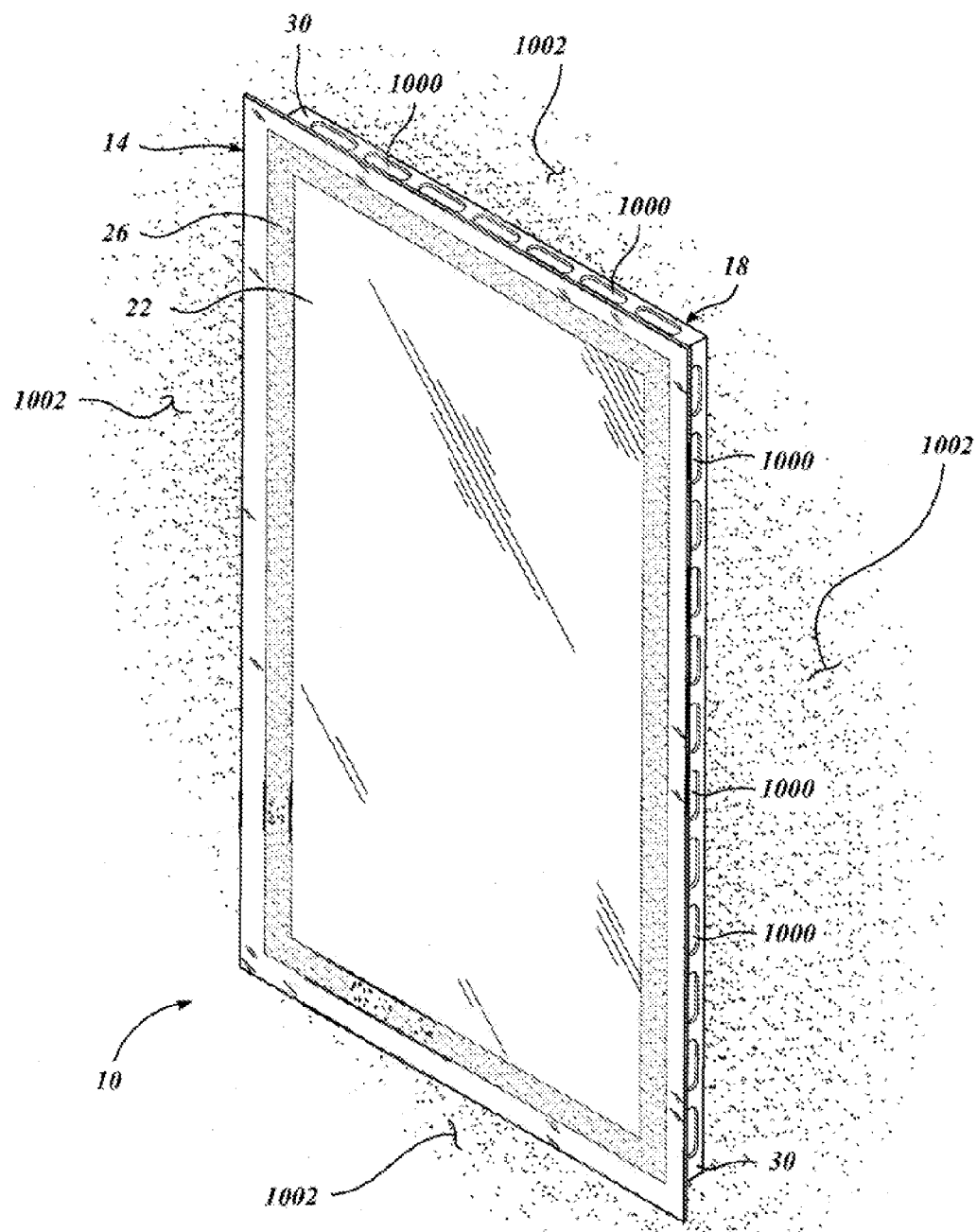
FIG. 10A illustrates a mirror assembly with apertures according to embodiments of the present disclosure
Figure 10B:
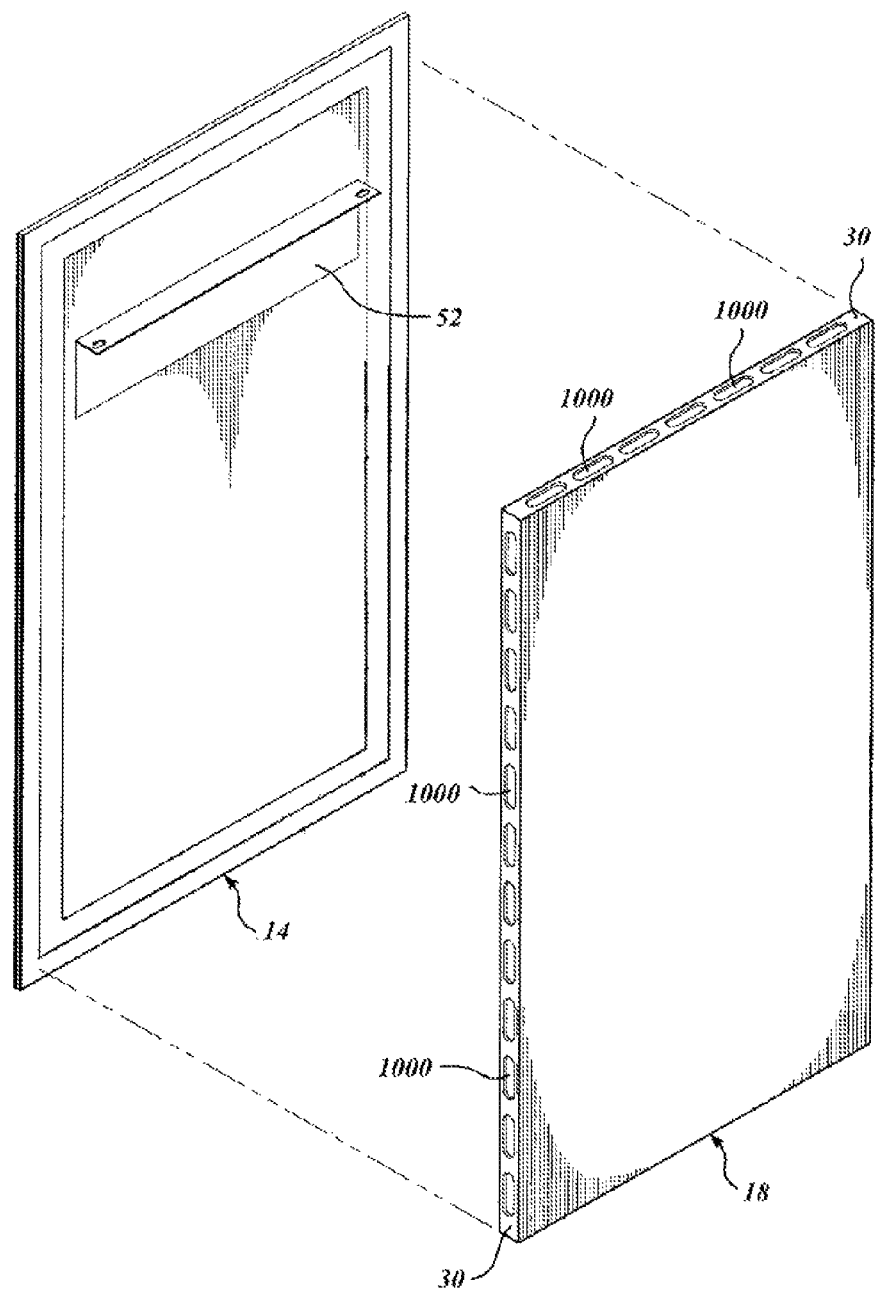
FIG. 10B illustrates an exploded view of the mirror assembly from FIG. 10A.

The chassis 18 further includes an outer edge section 30 extending around the perimeter of the chassis major surface 28. The outer edge section 30 extends a predetermined distance from the chassis major surface 28 in a substantially transverse manner. When the chassis 18 is mounted to the mirror platform 14, the outer edge section 30 extends between the chassis major surface 28 and the mirror rear surface 24 to enclose any electrical components mounted within the chassis 18 and define a mirror assembly interior. It should be appreciated that the outer edge section 30 may include apertures 1000, as illustrated in FIG. 10A and FIG. 10B, such that light radiating from the light sources 34 radiates through the plurality of apertures 1000 to illuminate the surroundings of the mirror assembly 10. Light radiating through the plurality of apertures 1000 is indicated at 1002, as illustrated in FIG. 10A and FIG. 10B.

Referring still to FIG. 1, the internal mounting structure 12 adapted to secure the mirror platform 14 to the chassis 18 will now be described in detail. The internal mounting structure 12 includes first and second hanger members, or first and second hanger brackets 42 and 46 that are preferably L-shaped. The first hanger bracket 42 includes a first leg 50 secured to the mirror rear surface 24 in any suitable manner, such as with adhesive, and a second leg 52 extending outwardly and substantially transversely therefrom. Likewise, the second hanger bracket 46 includes a first leg 56 secured to the mirror rear surface 24 in any suitable manner, such as with adhesive, and a second leg 58 extending outwardly and substantially transversely therefrom.

The first hanger bracket 42 is secured to an upper portion of the mirror platform 14 with the second leg positioned in a substantially horizontal manner and the first leg 50 extending downwardly from the second leg 52. The second hanger bracket 46 secured to a bottom portion of the mirror platform 14 with the second leg 58 positioned in a substantially horizontal manner and the first leg 56 extending upwardly from the second leg 58.

The first hanger bracket 42 includes first and second openings or slots 62 and 64 formed in the second leg 52. The first slot 62 is formed near one end of the second leg 52, and the second slot 64 is formed at the opposite end of the second leg 52. The second hanger bracket 46 also includes an opening or slot 66 formed in substantially the center of the second leg 58.

The internal mounting structure 12 further includes first and second support members, or support brackets 70 and 80 that are also preferably L-shaped. The first support bracket 70 includes a first leg 72 secured to the chassis major surface 28 in any suitable manner, such as with adhesive, and a second leg 74 extending outwardly and substantially transversely therefrom. The first support bracket 70 is secured to a top portion of the chassis major surface 28 with the second leg 74 positioned in a substantially horizontal manner and the first leg 72 extending downwardly from the second leg 74.

The first support bracket 70 includes first and second protrusions, or posts 76 and 78 extendinu outwardly and upwardly from the second leg 74. The first and second posts 76 and 78 are positioned near each end of the second leg 74 to fit within the first and second slots 62 and 54 formed within the first hanger bracket 42.

The second support bracket 80 is defined by an L-shaped lamp bracket 40 having a first leg 82 secured to the chassis major surface 28 in any suitable manner, such as with adhesive, and a second leg 84 extending outwardly and substantially transversely therefrom. The second support bracket 80 is secured to a bottom portion of the chassis major surface 28 with the second leg 84 positioned in a substantially horizontal manner and the first leg 82 extending upwardly from the second leg 84. The second support bracket 80 includes a protrusion, or post 86 extending upwardly from substantially the center of the second leg 84 that is adapted to fit within the opening 66 formed in the second hanger bracket 46.

The first and second hanger brackets 42 and 46 are secured to the mirror rear surface 24 such that they are disposed within the mirror assembly interior when the mirror platform 14 is secured to the chassis 18. Likewise, the first and second support brackets 70 and 80 are secured to the chassis 18 such that they are disposed within the mirror assembly interior when the mirror platform 14 is secured to the chassis 18. In this manner, when the first and second hanger brackets 42 and 46 are secured to the first and second support brackets 70 and 80, as will be described below, the brackets 42, 46, 70, and 80 are not exposed, thereby creating an aesthetically pleasing mirror assembly 10.

Figure 2:
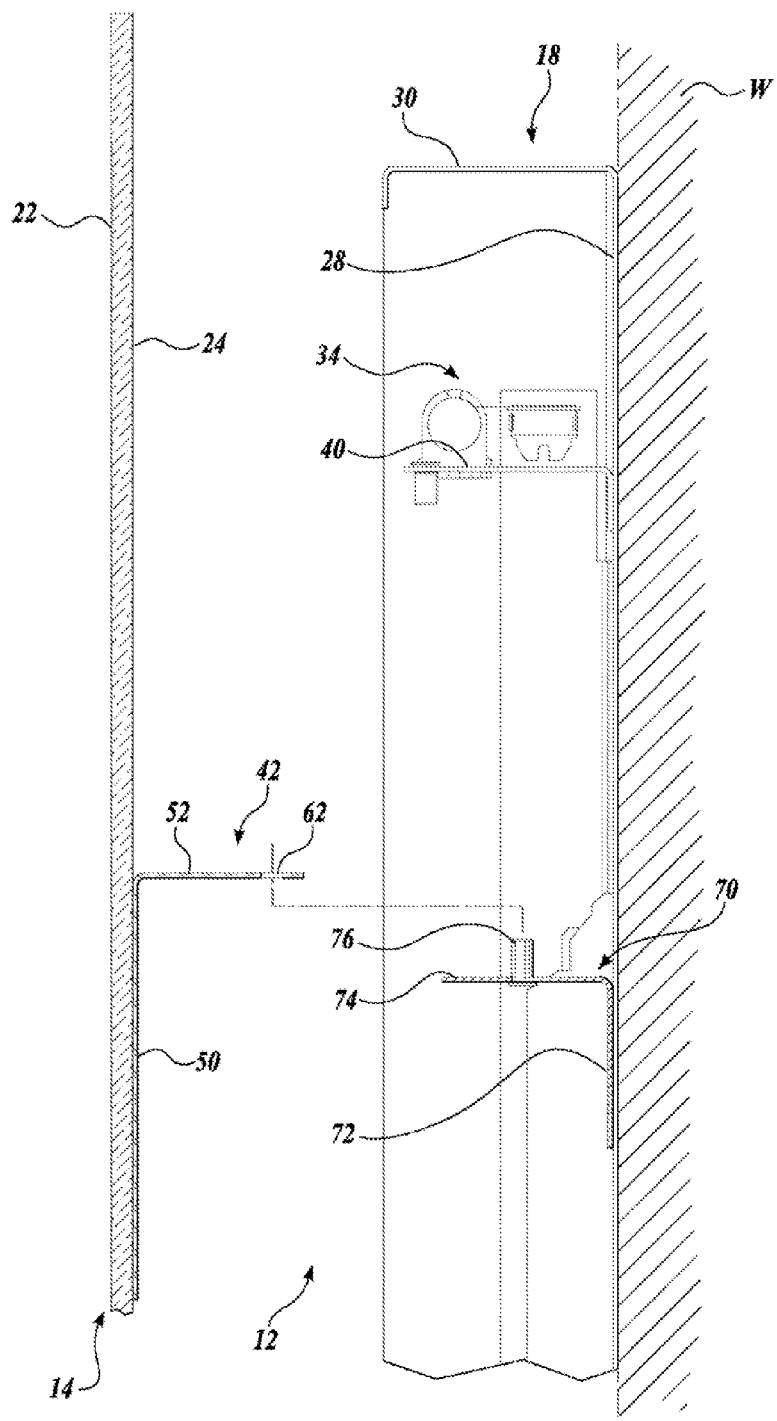
FIG. 2 is a cross-sectional side planar view of a first portion of the internal mounting structure of FIG. 1.
Figure 3:
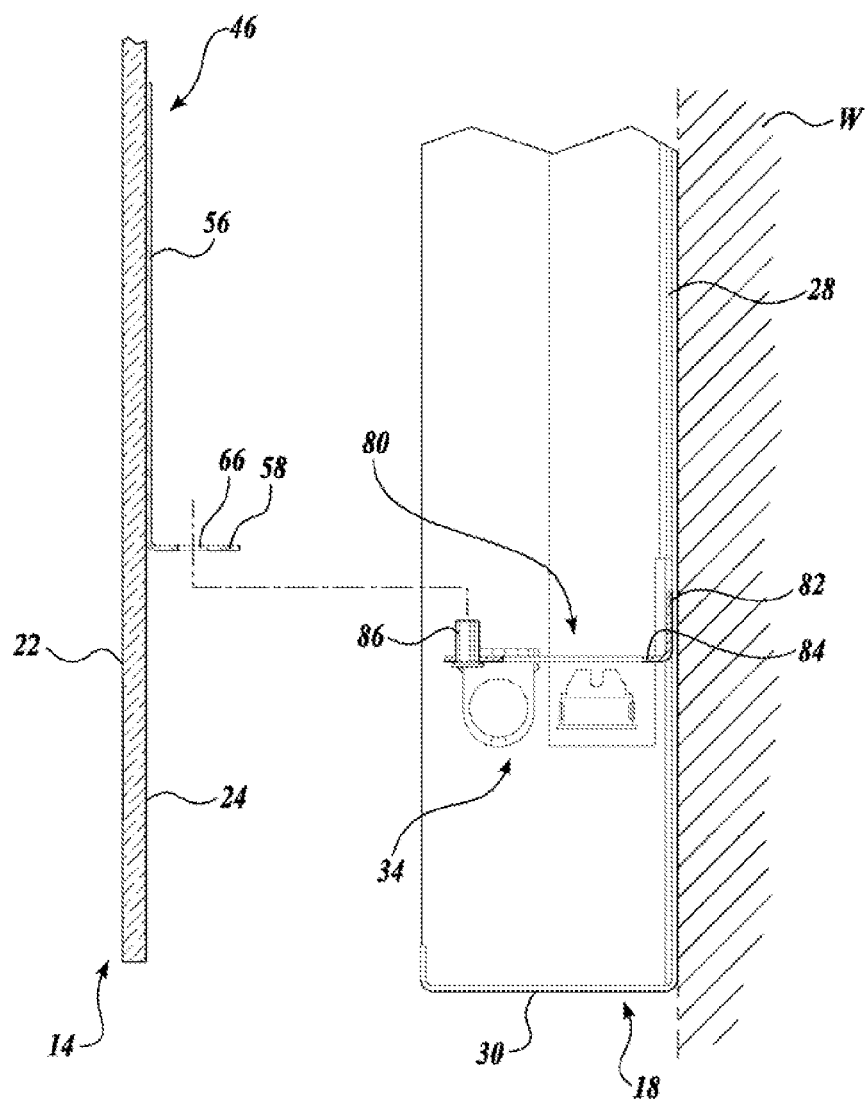
FIG. 3 is a cross-sectional side planar view of a second portion of the internal mounting structure of FIG. 1.

Referring to FIGS. 1-3, the manner in which the internal mounting structure 12 is used to secure the mirror platform 14 to the chassis 18 will be hereinafter described. Preferably, the chassis 18 is first secured to a wall W in any suitable manner such that the outer edge section 30 extends outwardly from the wall W. Moreover, the chassis 18 is positioned on the wall W such that the first support bracket 70 is positioned above the second support bracket 80, and both the first and second support brackets 70 and 80 are positioned substantially horizontally on the wall W.

The minor platform 14 is then positioned substantially parallel to the major surface 28 of the chassis 18, with the first and second hanger brackets 42 and 46 positioned slightly above the first and second support brackets 70 and 80. More specifically, the second leg 52 of the first hanger bracket 42 is positioned above the second leg 74 of the first support bracket 70, and the second leg 58 of the second hanger bracket 46 is positioned slightly above the second leg 84 of the second support bracket 80.

The mirror platform 14 is then moved towards the chassis 18 until the first and second slots 62 and 64 of the first hanger bracket 42 are positioned above the first and second posts 76 and 78 of the first support bracket 70 (only the first slot 62 and first post 76 are shown in FIG. 2 for clarity). Moreover, the slot 66 of the second hanger bracket 46 is positioned above the post 86 of the second support bracket 80. The mirror platform 14 is then lowered until the second leg 52 of the first hanger bracket 42 engages second leg 74 of the first support bracket 70, and the second leg 58 of the second hanger bracket 46 engages the second leg 84 of the second support bracket 80. Moreover, the posts 76, 78, and 86 are received within slots 62, 64, and 66, respectively.

With the first and second hanger brackets 42 and 46 resting on the first and second support brackets 70 and 80, the mirror platform 14 is secured on the chassis 18. Moreover, with posts 76, 78, and 86 received within slots 62, 64, and 66, the first and second hanger brackets 42 and 46 are prevented from sliding off the first and second support brackets 70 and 80. Furthermore, the third and fourth brackets 70 are positioned in the chassis 18 such that when the posts 76, 78, and 86 of the first and second hanger brackets 42 and 46 are received within slots 62, 64, and 66, the mirror platform 14 is aligned with the chassis 18. More specifically, the mirror platform 14 is positioned against the chassis 18 such that the outer edges of the mirror platform 14 substantially align the outer edges of the chassis 18. However, it should be appreciate that if the mirror platform 14 and chassis 18 were not substantially similar in shape and size, the mirror platform 14 may instead be positioned on the chassis 18 in any other suitable manner.

To disassemble the mirror assembly 10, the mirror platform 14 is lifted until the posts 76, 78, and 86 of the first and second hanger brackets 42 and 46 are no longer received within slots 62, 64, and 66. The mirror platform 14 is thereafter moved away from the chassis 18. Thus, the mirror assembly 10 can be both assembled and disassembled in an easy manner.

Figure 1B:
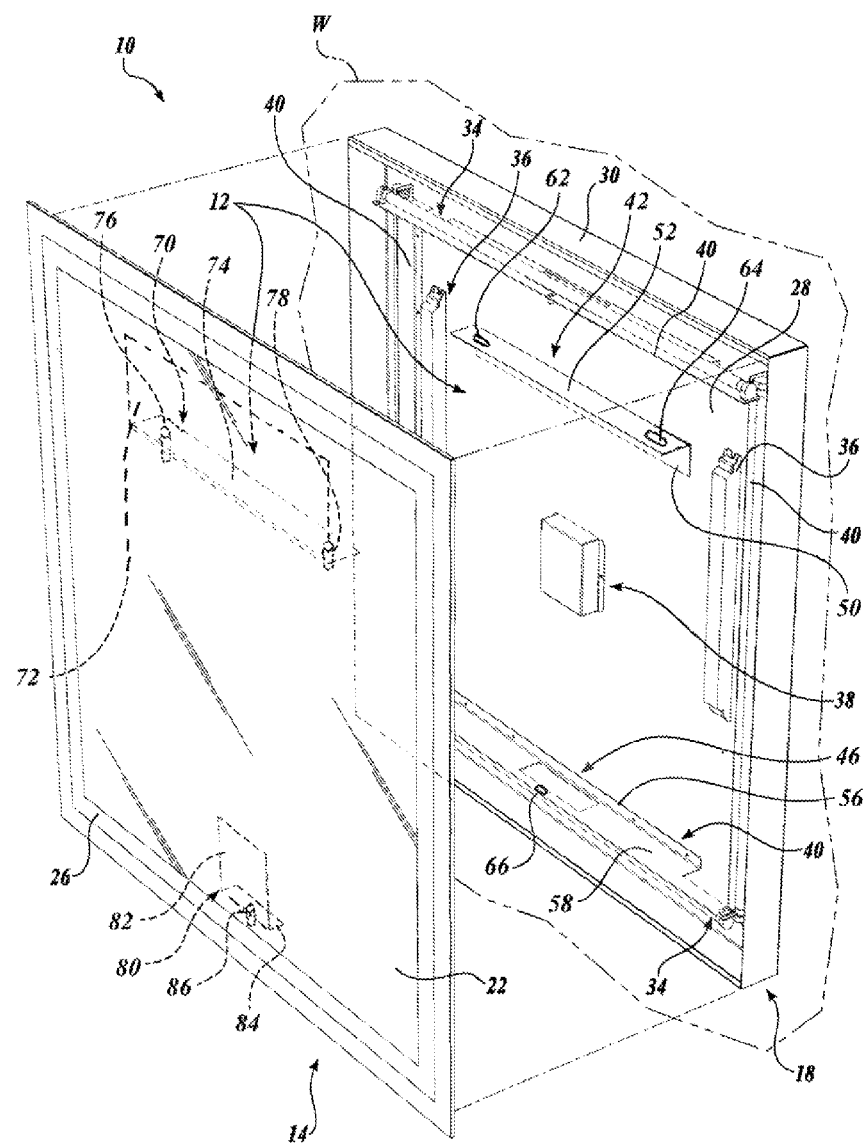
FIG. 1B is a mirror assembly having a internal mounting structure constructed in accordance with one embodiment of the present disclosure.
Figure 2B:
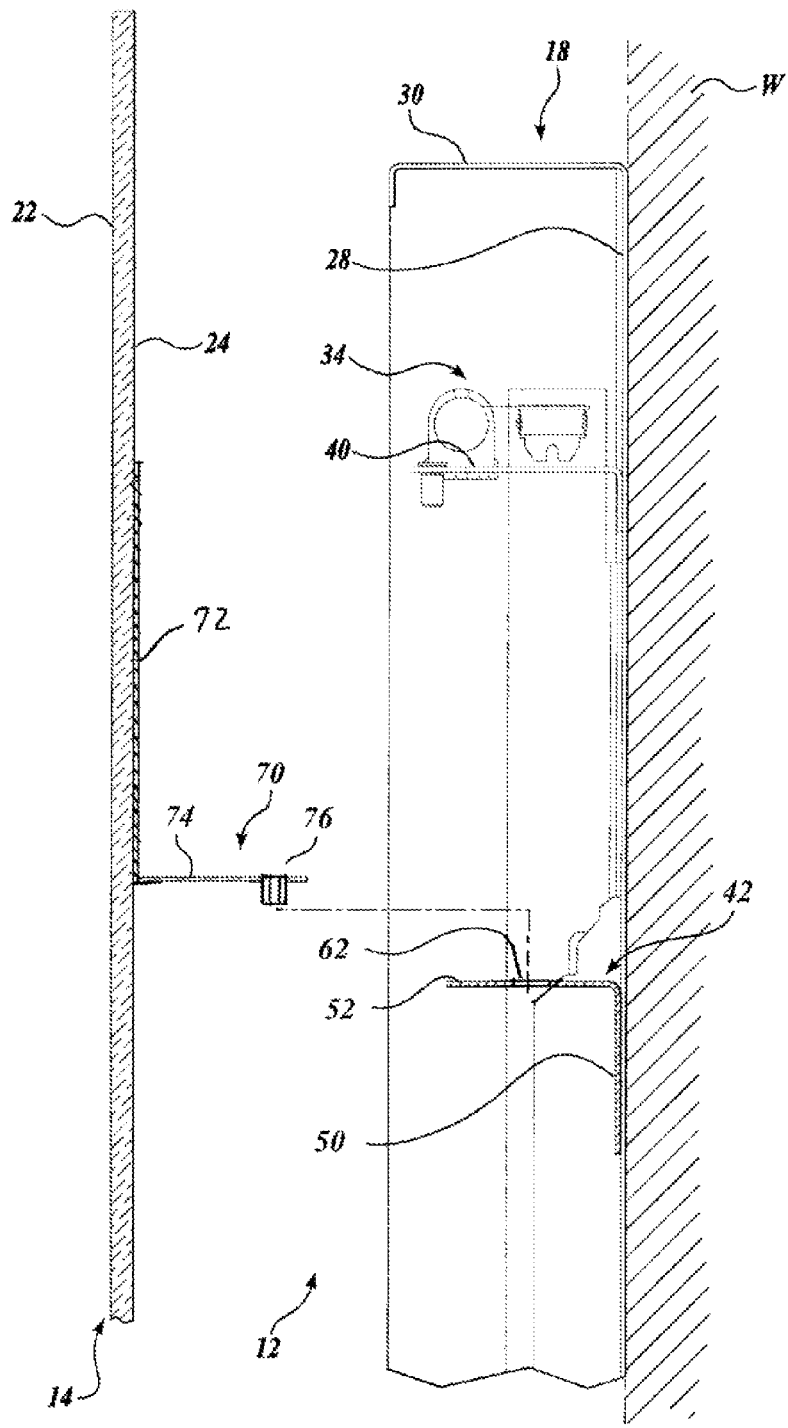
FIG. 2B is a cross-sectional side planar view of a first portion of the internal mounting structure of FIG. 1B.
Figure 3B:
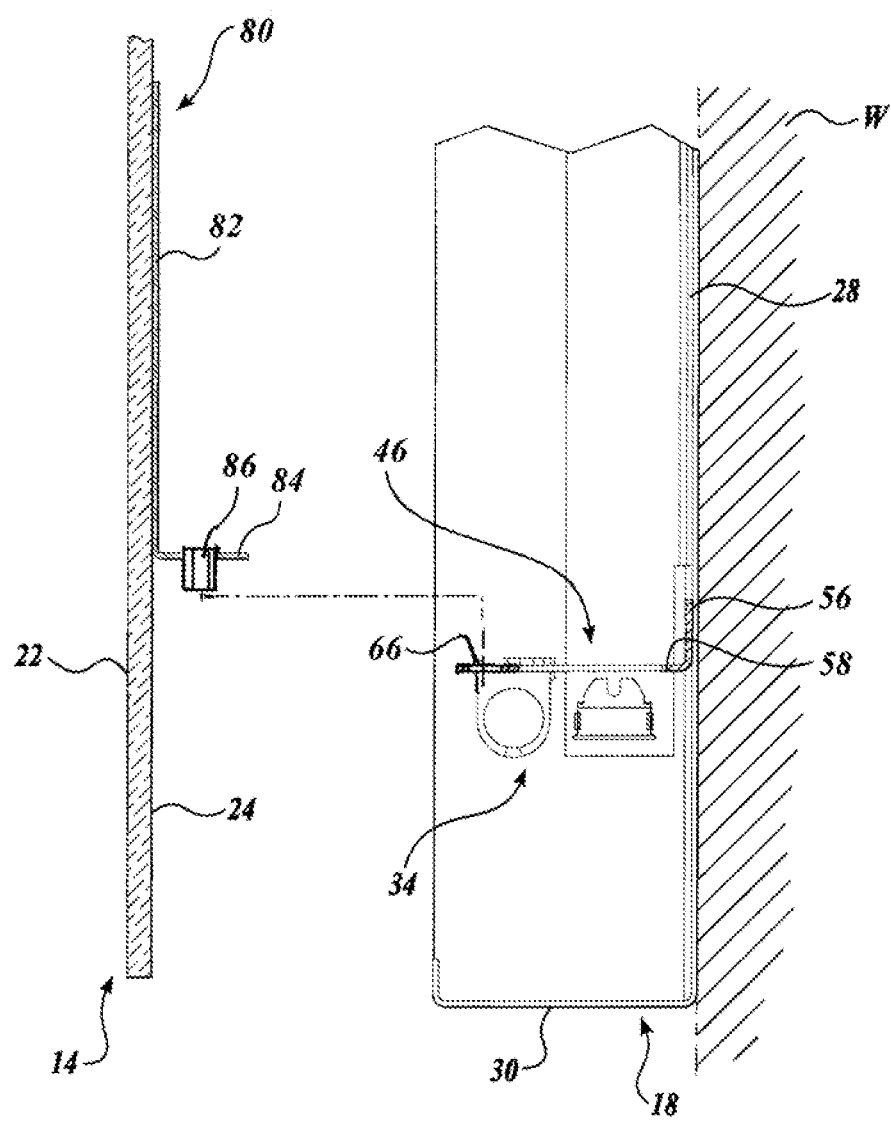
FIG. 3B is a cross-sectional side planar view of a second portion of the internal mounting structure of FIG. 1B.

The mounting structure includes a support member mounted to one of the rear surface of the mirror platform and the chassis and a hanger member mounted to the other of the rear surface of the mirror platform and the chassis. FIG. 1, FIG. 2, and FIG. 3, illustrate the hanger member 42 with the mirror platform 22 and the support member 70 with the chassis 18. FIG. 1B. FIG. 2B, and FIG. 38 illustrate the support member 70 with the mirror platform 22, and hanger member 42 with the chassis 18. Similarly, FIG. 1, FIG. 2, and FIG. 3, illustrate the hanger member 46 with the mirror platform 22 and the support member 80 with the chassis 18. FIG. 1B, FIG. 2B, and FIG. 3B illustrate the support member 80 with the mirror platform 22 and hanger member 46 with the chassis 18.

Figure 4:
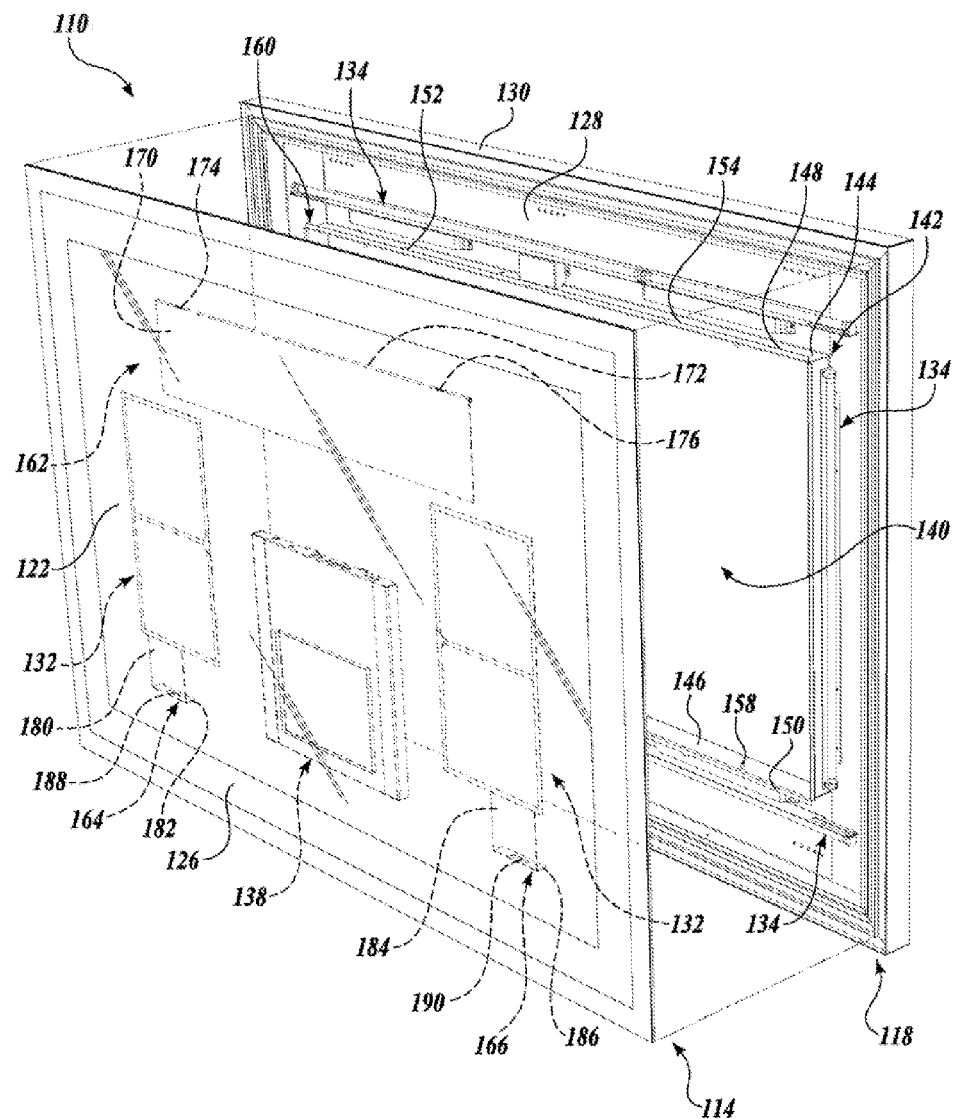
FIG. 4 is a mirror assembly having a internal mounting structure constructed in accordance with an alternate embodiment of the present disclosure.

Referring to FIG. 4, a first alternate embodiment of a mirror assembly 110 having an internal mounting structure 112 (see FIGS. 5 and 6) includes a framed or frameless mirror platform 114 and a chassis 118. The mirror platform 114 includes a first substantially reflective surface 122, a second non-reflective, rear surface 124 (see FIGS. 5 and 6), and one or more translucent back lit portions 126, similar to mirror platform 14.

The mirror assembly 110 may include several electrical components disposed between the mirror platform 114 and the chassis 118. For instance, the mirror assembly 110 may include a plurality of light sources 134 and electrical ballasts 136 received within the chassis 118. Furthermore, a media display device 138 and mirror defogger devices 132 may be secured to the mirror rear surface 124 of the mirror platform 114. The electrical components may be secured to the chassis 118 and mirror platform 114 in any suitable manner, such as with brackets, fasteners, adhesive, etc.

The chassis 118 is adapted to engage the mirror platform 114 and secure the mirror platform 114 to a wall W. The chassis 118 includes a major surface 128 that is substantially sized and shaped to correspond to the mirror platform 114. The major surface 128 is positionable in a substantially parallel relationship to the mirror platform 114 when the chassis 118 is engaged with the mirror platform 114. The chassis includes an outer edge section 130 that extends outwardly from the major surface 128 in a substantially transverse manner around the perimeter of the chassis major surface 128. The outer edge section 130 extends a predetermined distance such that when the chassis 118 is mounted to the mirror platform 114, the outer edge section 130 extends between the chassis major surface 128 and the mirror rear surface 124 to define a mirror assembly interior and enclose any electrical components therein.

Referring still to FIG. 4, the internal mounting structure 112 will now be described in detail. The internal mounting structure 112 is defined in part by the chassis 118. The chassis 118 includes an opening 140 formed in the chassis major surface 128 that is preferably the same shape as the major surface 128, such as rectangular. An outwardly extending member, or inner edge section 142 extends from the major surface 128 in a substantially transverse manner around the perimeter of the opening 140. The inner edge section 142 extends a predetermined distance such that when the chassis 118 is mounted to the mirror platform 114, the inner edge section 142 extends almost entirely between the chassis major surface 128 and the non-reflective surface 124 of the mirror platform 114.

The inner edge section 142 defines upper and lower inner edge sections 144 and 146 that are formed near the top and bottom of the chassis 118, respectively, and positioned substantially parallel to one another. The upper and lower inner edge sections 144 and 146 act as first and second support members adapted to receive the first, second, and third brackets 162, 164, and 166 thereon. First and second posts 156 and 158 extend upwardly and substantially transversely from the lower inner edge section 146 (see also FIG. 6).

The chassis 118 further includes a flange section 160 that extends outwardly and substantially transversely from the inner edge section 142 away from opening 140. As such, the flange section 160 is substantially parallel to the chassis major surface 128. The flange section 160 defines upper and lower flanges 148 and 150 on the upper and lower inner edge sections 144 and 146. First and second protrusions, or tabs 152 and 154 extend upwardly from the upper flange 148 in the same plane as the upper flange 148.

The internal mounting structure 112 further includes first, second, and third hanger members, or hanger brackets 162, 164, and 166. The first hanger bracket 162 includes a mounting portion 170 and a lip portion 172 formed along a top edge of the mounting portion 170. The mounting portion 170 is secured to an upper portion of the mirror rear surface 124 in a substantially horizontal manner with any suitable means, such as with an adhesive. The lip portion 172 is adapted to fit over the upper flange 148 of the chassis 18 and secure the mirror platform 14 to the chassis 18. The lip portion 172 also includes first and second openings or slots 172 and 176 that are adapted to receive the first and second tabs 152 and 154 of the chassis therein for aligning the mirror platform 114 on the chassis 118 as described above with respect to mirror assembly 10.

The second and third hanger brackets 164 and 166 are each preferably L-shaped. The second hanger bracket 164 includes a first leg 180 secured to the mirror rear surface 124 in any suitable manner, such as with adhesive, and a second leg 182 extending outwardly and substantially transversely therefrom. Likewise, the third hanger bracket 166 includes a first leg 184 secured to the mirror rear surface 124 in any suitable manner and a second leg 186 extending outwardly and substantially transversely therefrom. The second hanger bracket 164 includes an opening or slot 188 formed in its second leg 182, and the third hanger bracket 166 includes an opening or slot 190 formed in its second leg 186.

The second hanger bracket 164 is secured to a bottom portion of the mirror platform 114 on one side of the mirror platform 114 with the second leg 182 positioned in a substantially horizontal manner and the first leg 180 extending upwardly from the second leg 182. The third hanger bracket 166 is secured to a bottom portion of the mirror platform 114 on a second side of the mirror platform 114 with the second leg 186 positioned in a substantially horizontal manner and the first leg 184 extending upwardly from the second leg 186.

Figure 5:
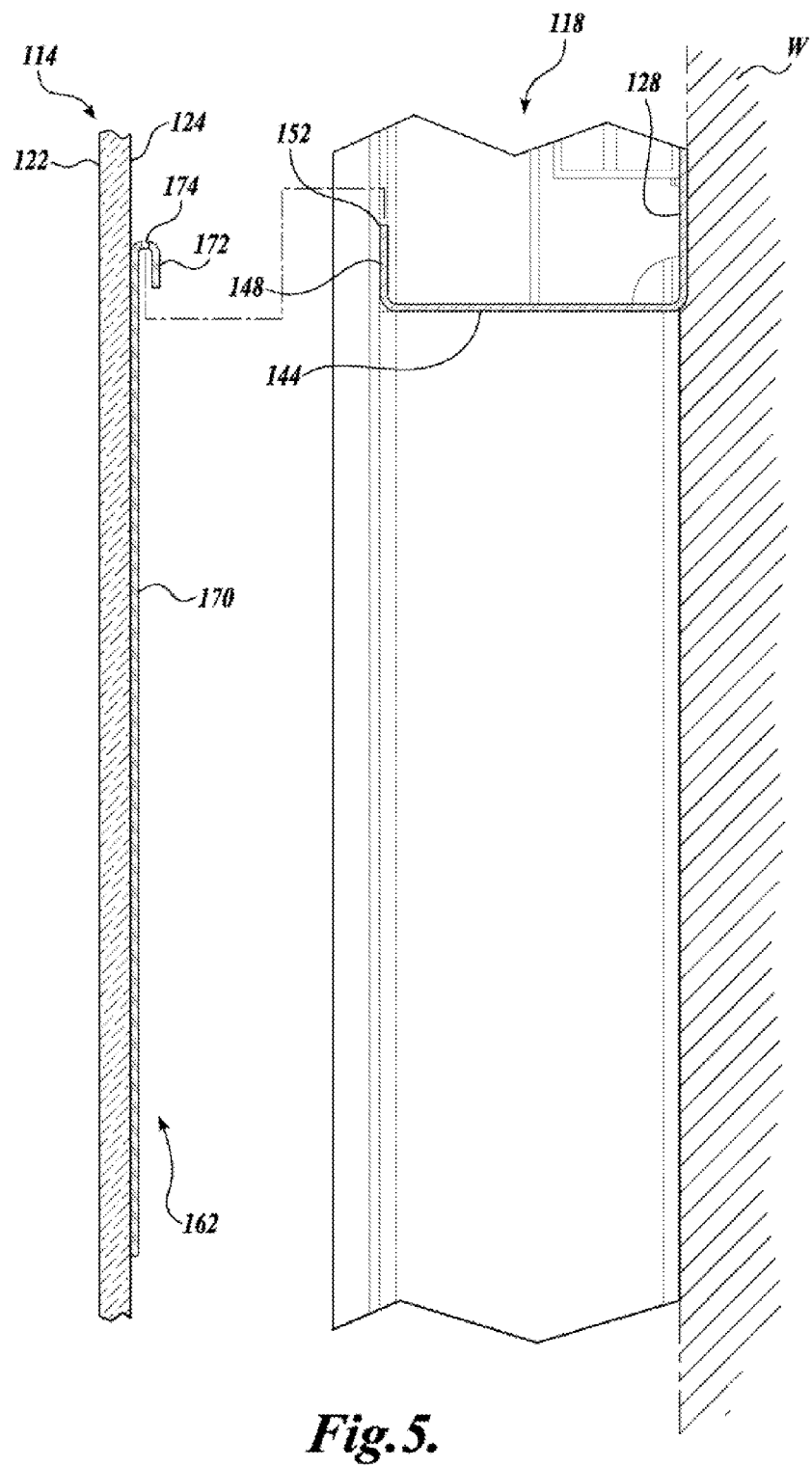
FIG. 5 is a cross-sectional side planar view of a first portion of the internal mounting structure of FIG. 4.
Figure 6:
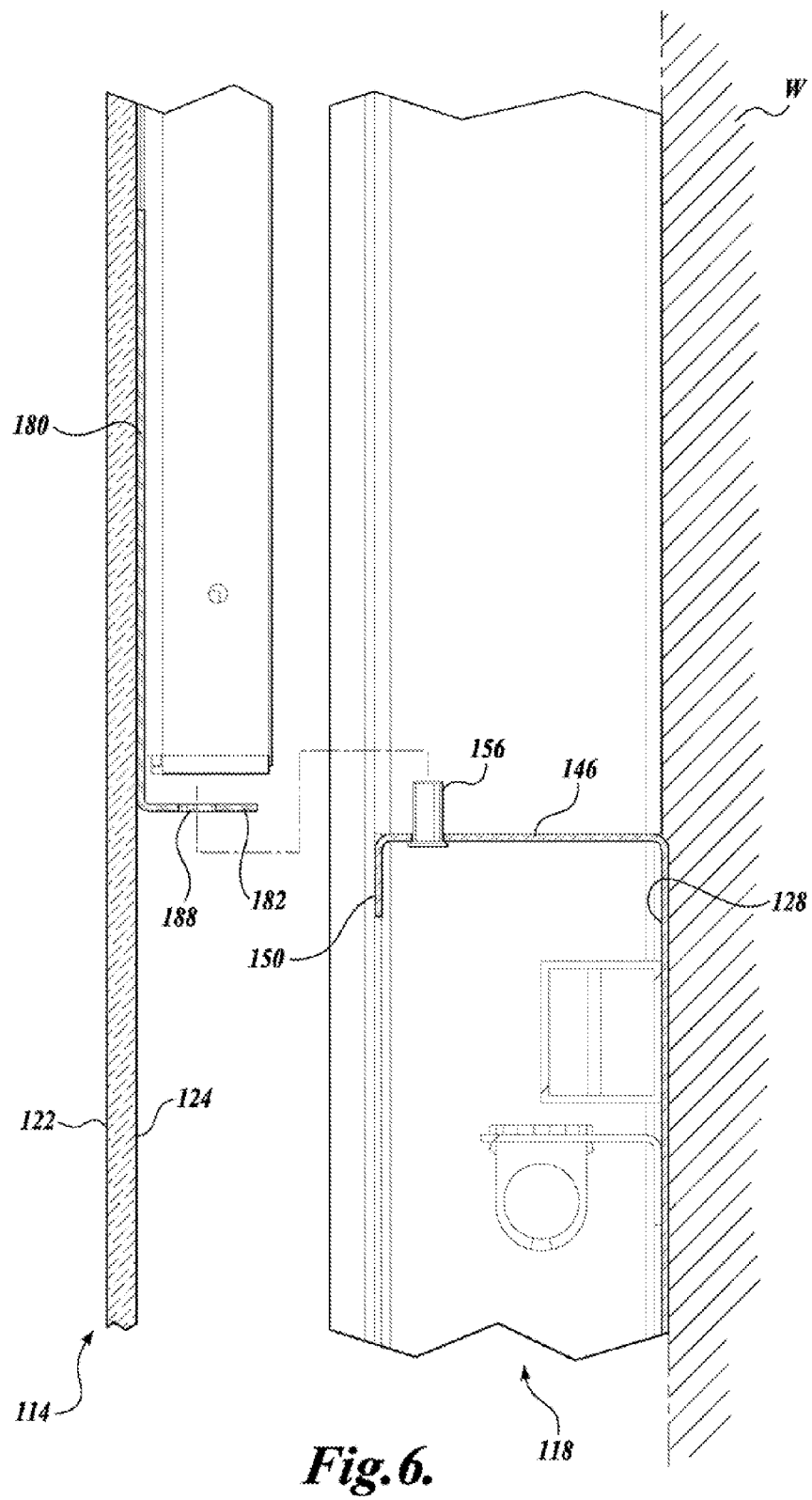
FIG. 6 is a cross-sectional side planar view of a second portion of the internal mounting structure of FIG. 4.

Referring to FIGS. 4-6, the manner in which the internal mounting structure 112 is used to secure the mirror platform 114 to the chassis 118 will be hereinafter described. Preferably, the chassis 118 is first secured to a wall W in any suitable manner such that the edge section 130 extends outwardly from the wall W and the upper and lower inner edge sections 144 and 146 are positioned substantially horizontally on the wall W.

The mirror platform 114 is then positioned substantially parallel to the chassis major surface 128, with the first hanger bracket 162 positioned slightly above the upper inner edge section 144 and the second and third brackets 164 and 166 positioned slightly above the lower inner edge section 146. More specifically, the lip portion 172 of the first hanger bracket 162 is positioned above the upper flange 148, and the second legs 182 and 186 of the second and third brackets 164 and 166 are positioned above the lower inner edge section 146.

The mirror platform 114 is then moved towards the chassis 118 until the first and second slots 174 and 176 of the first hanger bracket 162 are positioned above the first and second tabs 152 and 154 formed on the upper flange 148. Moreover, the slot 188 and 190 of the second and third brackets 164 and 166 are positioned above the first and second posts 156 and 158 on the lower inner edge section 146. The mirror platform 114 is then lowered until the lip portion 172 of the first hanger bracket 162 is received on the upper flange 148, and the second legs 182 and 186 of the second and third brackets 164 and 166 engage the lower inner edge section 146 of the chassis 118. Moreover, the tabs 152 and 154 are received within the slots 174 and 176 of the first hanger bracket 162, and the posts 156 and 158 are received within the slots 188 and 190 of the second and third brackets 164 and 166.

With the first hanger bracket 162 hanging on the upper flange 148 and the second and third brackets 164 and 166 resting on the lower inner flange section 146, the mirror platform 114 is secured on the chassis 118. Moreover, with tabs 152 and 154 received within slots 174 and 176 of the first hanger bracket 162, and posts 156 and 158 received within slots 188 and 190 of the second and third brackets 164 and 166, the first, second, and third brackets 162, 164, and 166 are prevented from sliding off the upper flange 148 and the lower inner edge section 146.

Moreover, the tabs 152 and 154 and slots 174 and 176 are positioned on the chassis 118 such that when the tabs 152 and 154 are received within the slots 174 and 176 of the first hanger bracket 162, and the posts 156 and 158 are received within the slots 188 and 190 of the second and third brackets 164 and 166, the mirror platform 114 is aligned with the chassis 118 as described above with respect to mirror assembly 10. Moreover, with the first, second, and third hanger brackets 162, 164, and 166 positioned to engage the upper and lower inner edge sections 144 and 146 defined on the interior of the chassis, the components of the internal mounting structure 12 are disposed within the mirror assembly interior when the mirror platform 114 is secured to the chassis 18.

To disassemble the mirror assembly 110, the mirror platform 114 is lifted until the tabs 152 and 154 are no longer received within slots 174 and 176 of the first hanger bracket 162 and the posts 156 and 158 are no longer received within the slots 188 and 190 of the second and third brackets 164 and 166. The mirror platform 114 is thereafter moved away from the chassis 118. Thus, the mirror assembly 110 can be both assembled and disassembled in an easy manner.

Figure 7:
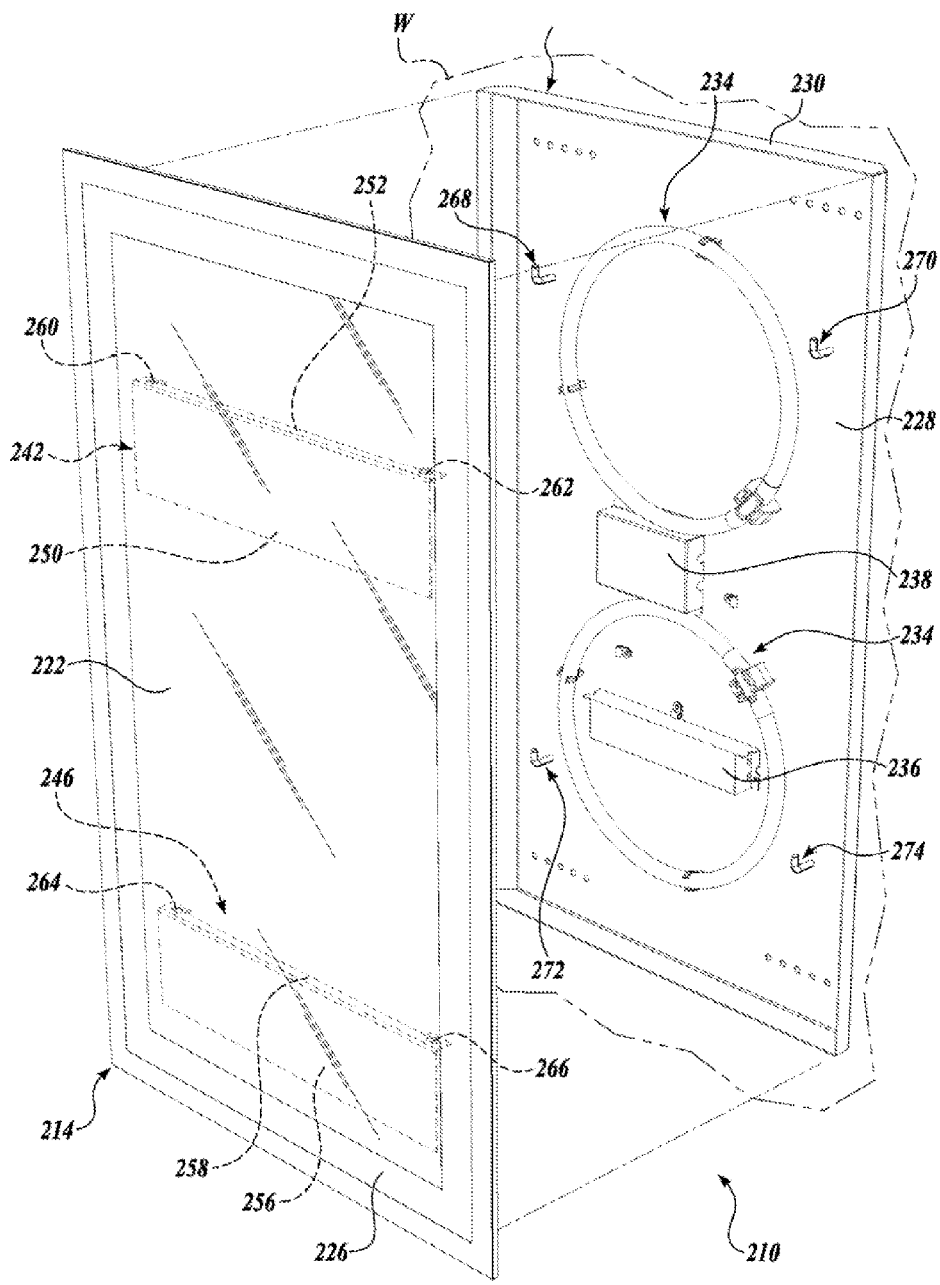
FIG. 7 is a mirror assembly having a internal mounting structure constructed in accordance with another embodiment of the present disclosure.

Referring to FIG. 7, a second alternate embodiment of the minor assembly 210 having an internal mounting structure 212 (see FIGS. 8 and 9) includes a framed or frameless mirror platform 214 and a chassis 218. The mirror platform 214 includes a first substantially reflective surface 222, a second nonreflective, rear surface 224 (see FIGS. 8 and 9), and one or more translucent backlit portions 226, similar to mirror platforms 14 and 114.

The mirror assembly 210 may include several electrical components disposed between the minor platform 214 and the chassis 218. For instance, the mirror assembly 210 may include a plurality of light sources 234, at least one electrical ballast 236, and a power cover 238 for a terminal box (not shown). The electrical components are preferably secured to a portion of the chassis 218 in any suitable manner, such as with a plurality of brackets, fasteners, adhesive, etc.

The chassis 218 is adapted to engage the mirror platform 214 and secure the mirror platform 214 to a wall W. The chassis 218 includes a major surface 228 that is substantially sized and shaped to correspond to the mirror platform 214. The major surface 228 is positionable in a substantially parallel relationship to the mirror platform 214 when the chassis 218 is engaged with the mirror platform 214. The chassis 218 includes an outer edge section 230 that extends outwardly from the major surface 228 in a substantially transverse manner around the perimeter of the chassis major surface 228. When the chassis 218 is mounted to the mirror platform 214, the outer edge section 230 extends between the chassis major surface 218 and the mirror rear surface 224 to enclose any electrical components and define and mirror assembly interior.

Referring still to FIG. 7, the internal mounting structure 212 will now be described in detail. The internal mounting structure 212 includes first and second hanger members or first and second hanger brackets 242 and 246 that are preferably L-shaped. The first hanger bracket 242 includes a first leg 250 secured to the mirror rear surface 224 in any suitable manner, such as with adhesive, and a second leg 252 extending outwardly and substantially transversely therefrom. Likewise, the second hanger bracket 246 includes a first leg 256 secured to the mirror rear surface 224 in any suitable manner, such as with adhesive, and a second leg 258 extending outwardly and substantially transversely therefrom.

The first hanger bracket 242 includes first and second openings or slots 260 and 262 formed in the second leg 252. The first slot 260 is formed near one end of the second leg 252, and the second slot 262 is formed at the opposite end of the second leg 252. The second hanger bracket 246 also includes first and second openings or slots 264 and 266 formed in the second leg 258. The first and second slots 264 and 266 formed in the second leg 258 of the second hanger bracket 246 are formed on opposite ends of the second leg 258.

The first hanger bracket 242 is secured to an upper portion of the mirror platform 214 with the second leg 252 positioned in a substantially horizontal manner and the first leg 250 extending downwardly from the second leg 252. The second hanger bracket 246 is secured to a bottom portion of the mirror platform 214 with the second leg 258 positioned in a substantially horizontal manner the first leg 256 extending downwardly from the second leg 258.

The internal mounting structure 212 further includes first, second, third, and fourth support members, or hooks 268, 270, 272, and 274 secured to the chassis major surface 228 and extending outwardly therefrom. The hooks 268, 270, 272, and 274 are positioned on the chassis major surface 228 such that each hook is located near a corner of the chassis major surface 228. Moreover, the first and second hooks 268 and 270 are located in substantially the same first horizontal plane, and the third and fourth hooks 272 and 274 are located in substantially the same second horizontal plane.

Figure 8:
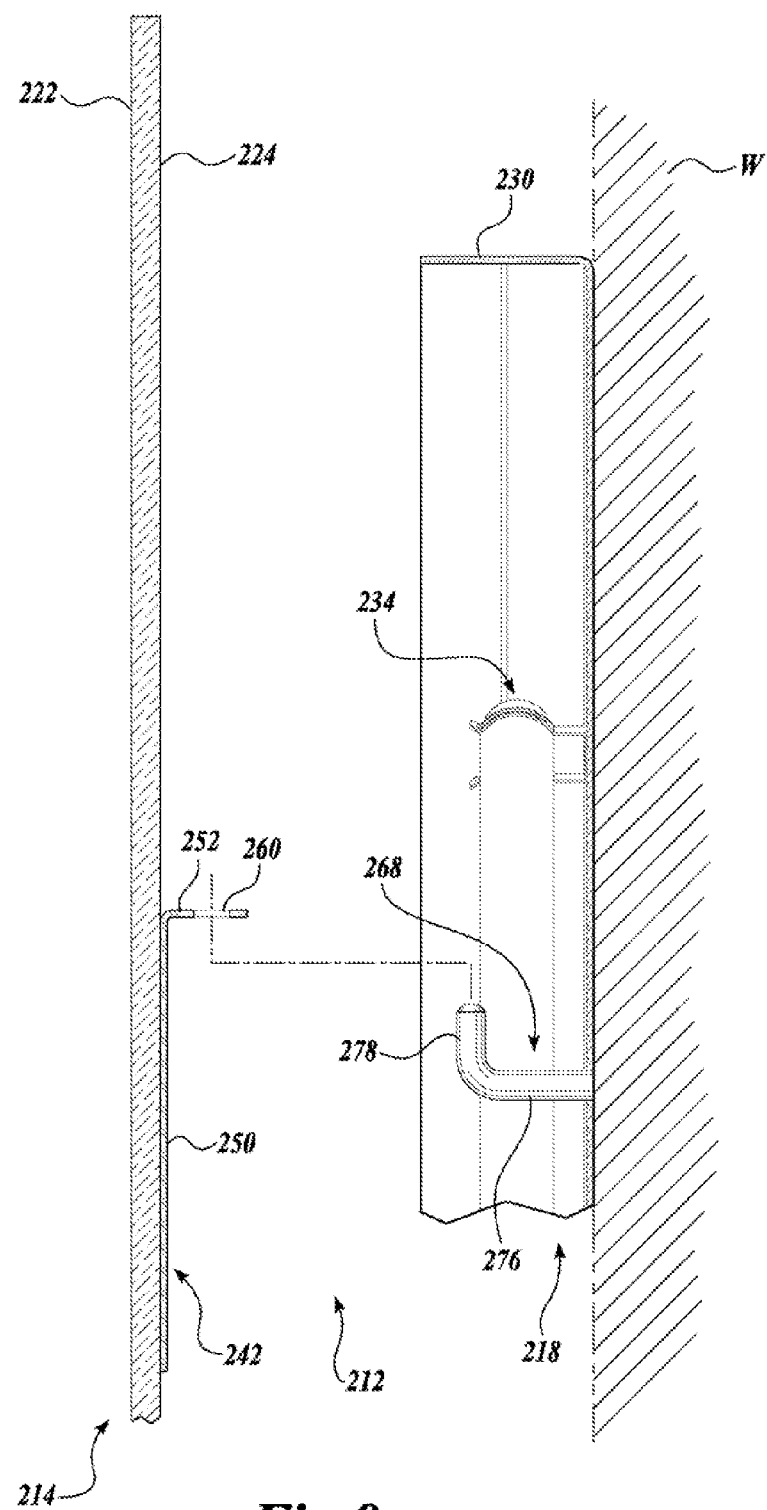
FIG. 8 is a cross-sectional side planar view of a first portion of the internal mounting structure of FIG. 7.
Figure 9:
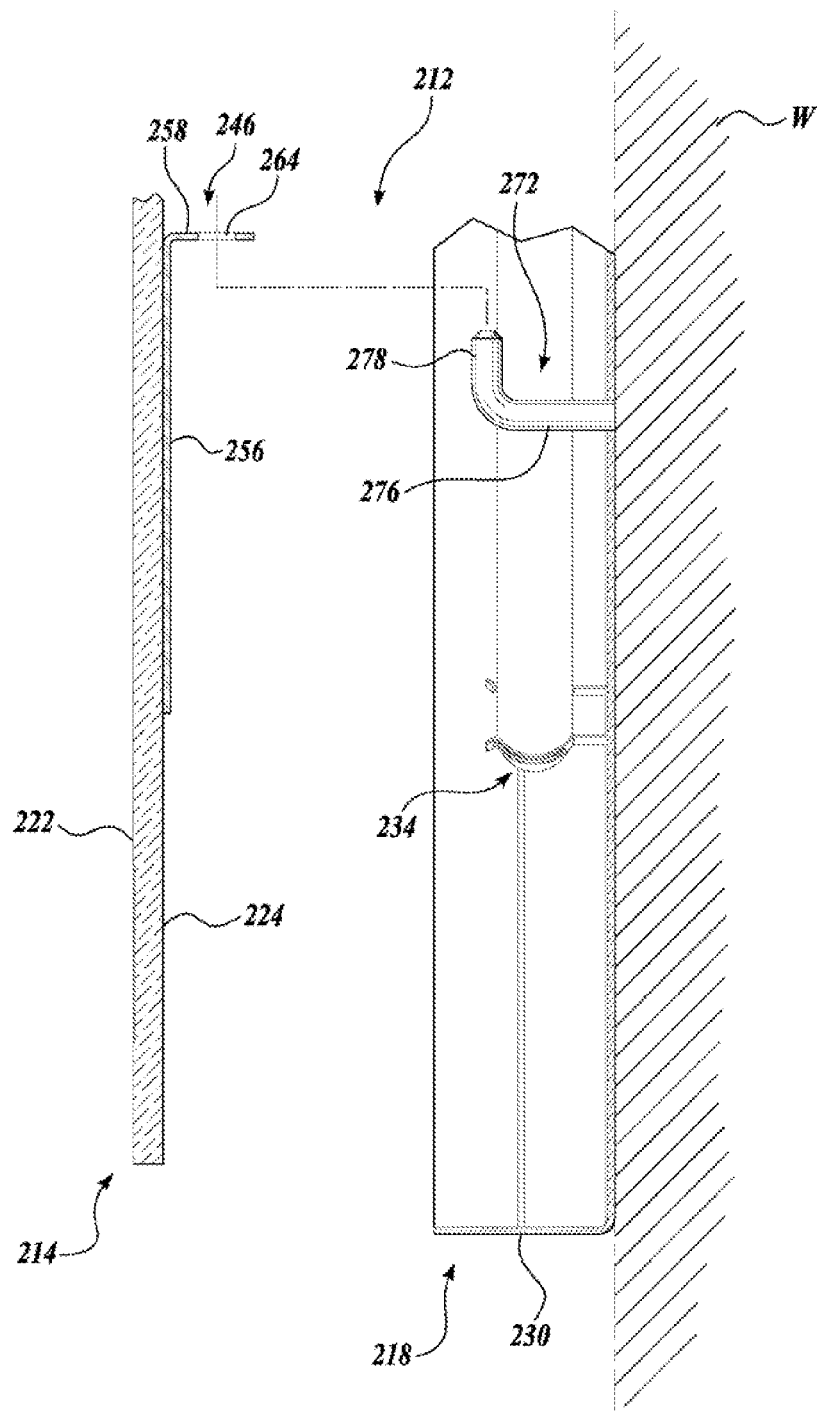
FIG. 9 is across-sectional side planar view of a second portion the internal mounting structure of FIG. 7

FIGS. 8 and 9 depict the first and third hooks 268 and 272 having a horizontal portion 276 extending substantially transversely and outwardly from the chassis major surface 228 and a vertical portion 278 extending upwardly and substantially transversely from the end of the horizontal portion 276. The second and fourth hooks 270 and 274 includes similar horizontal and vertical portions. The vertical portion 278 of the first and second hooks 268 and 270 are receivable within the first and second slots 260 and 262 of the first hanger bracket 242. Similarly, the vertical portion 278 of the third and fourth hooks 272 and 274 are receivable within the first and second slots 264 and 266 of the second hanger bracket 246.

Referring to FIGS. 7-9, the manner in which the internal mounting structure 212 is used to secure the mirror platform 214 to the chassis 218 will be hereinafter described. Preferably, the chassis 218 is first secured to a wall W in any suitable manner such that the outer edge section 230 extends outwardly from the wall W. Moreover, chassis 218 is positioned on the wall W such that the first and second hooks 268 and 270 are positioned above the third and fourth hooks 272 and 274.

The mirror platform 214 is then positioned substantially parallel to the chassis major surface 228, with the first hanger bracket 242 positioned slightly above the first and second hooks 268 and 270, and the second hanger bracket 246 positioned slightly above the third and fourth hooks 272 and 274. More specifically, the second leg 252 of the first hanger bracket 242 is positioned above the first and second hooks 268 and 270, and the second leg 258 of the second hanger bracket 246 is positioned slightly above the third and fourth hooks 272 and 274.

The mirror platform 214 is then moved toward the chassis 218 until the first and second slots 260 and 262 of the first hanger bracket 242 are positioned above the vertical portions 278 of the first and second hooks 268 and 270. The first and second slots 264 and 266 of the second hanger bracket 246 are also positioned above the vertical portions 278 of the third and fourth hooks 272 and 274. The mirror platform 214 is then lowered until the vertical portions 278 of the first, second, third, and fourth hooks 268, 270, 272, and 274 are received within slots 260, 262, 264, and 266, respectively. As such, the first and second hanger brackets 242 and 246 are hung on hooks 268, 270, 272, and 274, thereby securing the minor platform 214 on the chassis 218.

The first, second, third, and fourth hooks 268, 270, 272, and 274 are positioned on the chassis major surface 228 such that the first and second hanger brackets 242 and 246, and therefore the mirror platform 214, are aligned on the chassis 218 when the hooks 268, 270, 272, and 274 are received within the slots 260, 262, 264, and 266. Moreover, the hooks 268, 270, 272, and 274 are positioned on the chassis 218, and the first and second hanger brackets 242 and 246 are positioned on the mirror rear surface 224 such that the hooks 268, 270, 272, and 274 and brackets 242 and 246 are disposed within the mirror assembly interior.

To disassemble the mirror assembly 210, the mirror platform 214 is lifted until the hooks 268, 270, 272, and 274 are no longer received within slots 260, 262, 264, and 266 of the first and second hanger brackets 242 and 246. The mirror platform 214 is thereafter moved away from the chassis 218. Thus, the mirror assembly 210 can be both assembled and disassembled in an easy manner.

While illustrative embodiments have been illustrated and described, it will be appreciated that various changes can be made therein without departing from the spirit and scope of the present disclosure. For instance, it should be appreciated that any of the above mirror assemblies 10, 110, and 210 may be suitably used with any of the internal mounting structures 12, 112, and 212 described above. Thus, the foregoing description should be seen as descriptive and not limiting the claimed subject matter.

What is claimed is:

1. A mirror assembly mountable to a wall, the mirror assembly comprising:
    (a) a mirror platform having a front surface and a rear surface;
    (b) a chassis engageable with the mirror platform to define a mirror assembly interior, the chassis is mountable to the wall;
    (c) at least one electrical component disposed within the mirror assembly interior; and
    (d) a single mounting structure disposed within the mirror assembly interior, comprising:
        (i) a first support member, the first support member extends outwardly from one of the rear surface of the mirror platform and the chassis, the first support member extends within the mirror assembly interior and has a horizontal dimension that is greater than an outward dimension; and (ii) a first hanger member, the first hanger member extends outwardly from the other of the rear surface of the mirror platform and the chassis, the first hanger member extends within the mirror assembly interior and has a horizontal dimension that is greater than an outward dimension, wherein the first hanger member is removably securable to the first support member, the single mounting structure is configured to mount the mirror platform to the chassis in alignment when one of the first support member and the first hanger member is lowered onto the other of the first support member and the first hanger member, whereby the mirror platform is secured to the chassis.

2. The mirror assembly of claim 1, wherein the first hanger member has a first opening.

3. The mirror assembly of claim 2, wherein the opening is a first slot.

4. The mirror assembly of claim 3, the first support member has a first protrusion, wherein the first slot is configured to receive the first protrusion when the first support member is lowered onto the first hanger member.

5. The mirror assembly of claim 4, wherein the first protrusion extends downwardly from the first support member.

6. The mirror assembly of claim 5, wherein the first protrusion is in a form of a post.

7. The mirror assembly of claim 2, the single mounting structure further comprising:

(iii) a second support member, the second support member extends outwardly from one of the rear surface of the mirror platform and the chassis, the second support member extends within the mirror assembly interior and has a horizontal dimension that is greater than an outward dimension; and (iv) a second hanger member, the second hanger member extends outwardly from the other of the rear surface of the mirror platform and the chassis, the second hanger member extends within the mirror assembly interior and has a horizontal dimension that is greater than an outward dimension, wherein the second hanger member is removably securable to the second support member, the single mounting structure is configured to mount the mirror platform to the chassis in alignment when one of the second support member and the second hanger member is lowered onto the other of the second support member and the second hanger member, whereby the mirror platform is secured to the chassis.

8. The mirror assembly of claim 7, wherein the second hanger member has a first end, a second end, and an opening, the opening is located in-between the first end and the second end.

9. The mirror assembly of claim 8, wherein the opening is a slot.

10. The mirror assembly of claim 1, wherein the first support member has a flange section, the flange section extends upwardly and horizontally, the first hanger member has a lip portion, the lip portion extends horizontally, the lip portion is removably securable to the flange portion.

11. The mirror assembly of claim 10, wherein the lip portion has at least one opening and the flange portion has at least one protrusion, wherein the at least one opening is configured to receive the at least one protrusion when the first hanger member is lowered onto the first support member.

12. The mirror assembly of claim 7, wherein the second support member has a flange section, the flange section extends upwardly and horizontally, the second hanger member has a lip portion that extends horizontally, the lip portion is removably securable to the flange portion.

13. The mirror assembly of claim 12, wherein the lip portion has at least one opening and the flange portion has at least one protrusion, wherein the at least one opening is configured to receive the at least one protrusion when the first hanger member is lowered onto the first support member.

14. The mirror assembly of claim 2, wherein the single mounting structure is not exposed when the mirror platform is engaged with the chassis.

15. A mirrorssembly mountable to a wall, the mirror assembly comprising:

(a) a mirror platform having a front surface and a rear surface;

(b) a chassis engageable with the mirror platform to define a mirror assembly interior, the chassis is mountable to the wall;

(c) at least one electrical component disposed within the mirror assembly interior; and (d) a single mounting structure disposed within the mirror assembly interior, comprising:

a first support member, the first support member extends outwardly from one of the rear surface of the mirror platform and the chassis, the first support member extends horizontally and has a horizontal dimension that is greater than an outward dimension; and (ii) a first hanger member, the first hanger member extends outwardly from the other of the rear surface of the mirror platform and the chassis, the first hanger member extends horizontally and has a horizontal dimension that is greater than an outward dimension, wherein (1) the first hanger member is removably securable to the first support member, and (2) the mirror platform is secured to the chassis when one of the first support member and the first hanger member is lowered onto the other of the first support member and the first hanger member.

16. The mirror assembly of claim 15, wherein the mirror platform is aligned with the chassis when one of the first support member and the first hanger member is lowered onto the other of the first support member and the first hanger member.

17. The or assembly of claim 16, wherein the first hanger member has a first opening and the first opening is a first slot.

18. The mirror assembly of claim 17, the first support member has a first protrusion, wherein the first slot is configured to receive the first protrusion when the first support member is lowered onto the first hanger member.

19. The mirror assembly of claim 18, wherein the first protrusion extends downwardly from the first support member.

20. The mirror assembly of claim 19, wherein the first protrusion is in a form of a post.

21. The mirror assembly of claim 17, the single mounting structure further comprising:

(iii) a second support member, the second support member extends outwardly from one of the rear surface of the mirror platform and the chassis, the second support member extends within the mirror assembly interior and has a horizontal dimension that is greater than an outward dimension; and (iv) a second hanger member, the second hanger member extends outwardly from the other of the rear surface of the mirror platform and the chassis, the second hanger member extends within the mirror assembly interior and has a horizontal dimension that is greater than an outward dimension, wherein the second hanger member is removably securable to the second support member, the single mounting structure is configured to mount the mirror platform to the chassis in alignment when one of the second support member and the second hanger member is lowered onto the other of the second support member and the second hanger member, whereby the mirror platform is secured to the chassis.

22. The mirror assembly of claim 21, wherein the second hanger member has a first end, a second end, and an opening, the opening is located in-between the first end and the second end and the opening a slot.

23. The mirror assembly of claim 16, wherein the first support member has a flange section, the flange section extends upwardly and horizontally, the first hanger member has a lip portion that extends horizontally, the lip portion is removably securable to the flange portion.

24. The mirror assembly of claim 23, wherein the lip portion has at least one opening and the flange portion has at least one protrusion, wherein the at least one opening is configured to receive the at least one protrusion when the first hanger member is lowered onto the first support member.

25. The mirror assembly of claim 21, wherein the second support member has a flange section, the flange section extends upwardly and horizontally, the second hanger member has a lip portion that extends horizontally, the lip portion is removably securable to the flange portion.

26. The mirror assembly of claim 25, wherein the lip portion has at least one opening and the flange portion has at least one protrusion, wherein the at least one opening is configured to receive the at least one protrusion when the first hanger member is lowered onto the first support member.

27. A mirror assembly mountable, to a wall, the mirror assembly comprising:

(a) a mirror platform having a front surface and a rear surface;

(b) a chassis engageable with the mirror platform to define a mirror assembly interior, the chassis is mountable to the wall;

(c) at least one electrical component disposed within the mirror assembly interior; and (d) a single mounting structure disposed within the mirror assembly interior, comprising:

(i) a first support member, the first support member extends outwardly from one of the rear surface of the mirror platform and the chassis, the first support member extends within the mirror assembly interior and has a horizontal dimension that is greater than an outward dimension;

(ii) a first hanger member, the first hanger member extends outwardly from the other of the rear surface of the mirror platform and the chassis, the first hanger member extends within the mirror assembly interior and has a horizontal dimension that is greater than an outward dimension, (iii) a second support member, the second support member extends outwardly from one of the rear surface of the mirror platform and the chassis, the second support member extends within the mirror assembly interior and has a horizontal dimension that is greater than an outward dimension; and (iv) a second hanger member, the second hanger member extends outwardly from the other of the rear surface of the mirror platform and the chassis, the second hanger member extends within the mirror assembly interior and has a horizontal dimension that is greater than an outward dimension, wherein the first hanger member is removably securable to the first support member and the second hanger member is removably securable to the second support member, the single mounting structure is configured to mount the mirror platform to the chassis when one of the first support member and the first hanger member is lowered onto the other of the first support member and the first hanger member and one of the second support member and the second hanger member is lowered onto the other of the second support member and the second hanger member, whereby the mirror platform is secured to the chassis.

28. The mirror assembly of claim 27, wherein the mirror platform is aligned with the chassis when one of the first support member and the first hanger member is lowered onto the other of the first support member and the first hanger member.

29. The mirror assembly of claim 27, wherein the first support member has a flange section, the flange section extends upwardly and horizontally, the first hanger member has a lip portion that extends horizontally, the lip portion is removably securable to the flange portion.

30. The mirror assembly of claim 29, wherein the lip portion has at least one opening and the flange portion has at least one protrusion, wherein the at least one opening is configured to receive the at least one protrusion when the first hanger member is lowered onto the first support member.

* * * * *